(12) United States Patent
Dethier et al.

(10) Patent No.: US 11,454,452 B2
(45) Date of Patent: Sep. 27, 2022

(54) HEAT EXCHANGER FOR A MOLTEN SALT STEAM GENERATOR IN A CONCENTRATED SOLAR POWER PLANT (III)

(71) Applicant: Cockerill Maintenance & Ingenierie S.A., Seraing (BE)

(72) Inventors: Alfred Dethier, Sprimont (BE); Stephane Winand, Angleur (BE); Yves Lecloux, Embourg (BE); Ridha Harzallah, Liege (BE); Ildo Agnetti, Seraing (BE); Thomas Bauthier, Hannut (BE); Christopher Detaille, Filot (BE)

(73) Assignee: JOHN COCKERILL S.A., Seraing (BE)

( * ) Notice: Subject to any disclaimer, the term of this patent is extended or adjusted under 35 U.S.C. 154(b) by 212 days.

(21) Appl. No.: 16/767,145

(22) PCT Filed: Dec. 5, 2018

(86) PCT No.: PCT/EP2018/083579
§ 371 (c)(1),
(2) Date: May 27, 2020

(87) PCT Pub. No.: WO2019/115306
PCT Pub. Date: Jun. 20, 2019

(65) Prior Publication Data
US 2020/0386484 A1    Dec. 10, 2020

(30) Foreign Application Priority Data

Dec. 11, 2017  (EP) ..................................... 17206472
Dec. 22, 2017  (CN) ......................... 201711399442.8
(Continued)

(51) Int. Cl.
*F28D 7/06*   (2006.01)
*F28D 7/16*   (2006.01)
(Continued)

(52) U.S. Cl.
CPC ............. *F28D 7/1669* (2013.01); *F28D 7/06* (2013.01); *F28D 7/1607* (2013.01); *F28F 9/22* (2013.01);
(Continued)

(58) Field of Classification Search
CPC .......... F28D 7/06; F28D 7/16; F28D 2265/26; F28F 9/22; F28F 2265/26
See application file for complete search history.

(56) References Cited

U.S. PATENT DOCUMENTS 1,782,409 A    11/1930  Chute
2,384,714 A    9/1945   Villiger
(Continued)

FOREIGN PATENT DOCUMENTS

EP    1876391 A1 *  1/2008  ............. F22G 1/005
EP    2955469 A1 * 12/2015  ............. F25B 39/02
(Continued)

*Primary Examiner* — Eric S Ruppert
(74) *Attorney, Agent, or Firm* — Leydig, Voit & Mayer, Ltd.

(57) ABSTRACT

A heat exchanger includes: a first straight section; a second straight section; and a bent section or elbow linking the first straight section and the second straight section. Each straight section comprises a part of an internal cylindrical shell and of an external cylindrical shell, both cooperating to form an intershell space enclosing a bundle of parallel U-bent tubes having each a first and a second straight part respectively located in the first straight section and second straight section of the exchanger and a 180°-bent part located in the bent section or elbow of the exchanger, so that, in use, a first fluid to be heated and vaporized is flowing in the tubes. The
(Continued)

external cylindrical shell is provided respectively at one end with an inlet and at another end with an outlet for a second fluid which is a hot thermal fluid.

17 Claims, 10 Drawing Sheets

(30) Foreign Application Priority Data

Dec. 22, 2017 (CN) .......................... 201721813845.8
Dec. 22, 2017 (EP) ...................................... 17209929
Dec. 22, 2017 (KR) ........................ 10-2017-0178274

(51) Int. Cl.
  *F28F 9/22* (2006.01)
  *F22B 1/02* (2006.01)
  *F22B 37/20* (2006.01)

(52) U.S. Cl.
  CPC ............. *F22B 1/025* (2013.01); *F22B 37/205* (2013.01); *F28F 2009/222* (2013.01); *F28F 2265/26* (2013.01)

(56) References Cited

U.S. PATENT DOCUMENTS

| | | |
|---|---|---|
| 2,693,942 A | 11/1954 | Guala |
| 3,400,758 A | 9/1968 | Man |
| 4,136,734 A * | 1/1979 | Sasaki ..................... F28B 9/10 |
| | | 122/483 |
| 4,156,457 A | 5/1979 | Murray |
| 4,493,368 A | 1/1985 | Einar et al. |
| 4,557,322 A | 12/1985 | Nipple |
| 5,261,485 A | 11/1993 | Dockendorff et al. |
| 2006/0289153 A1 * | 12/2006 | Mulder ................ F28D 7/1607 |
| | | 165/162 |
| 2015/0240792 A1 * | 8/2015 | Ehrsam ................. F01K 13/02 |
| | | 60/641.8 |

FOREIGN PATENT DOCUMENTS

| | | | |
|---|---|---|---|
| FR | 877844 A1 * | 1/1943 | |
| GB | 2020793 A | 11/1979 | |
| JP | S604790 A | 1/1985 | |
| WO | WO 2005019758 A1 | 3/2005 | |
| WO | WO-2007042529 A1 * | 4/2007 | .......... F28D 7/1607 |
| WO | WO 2008095248 A1 | 8/2008 | |
| WO | WO 2009148822 A2 | 12/2009 | |

* cited by examiner

FIG. 1

PRIOR ART

HEAT EXCHANGER FOR A MOLTEN SALT STEAM GENERATOR IN A CONCENTRATED SOLAR POWER PLANT (III)

CROSS-REFERENCE TO PRIOR APPLICATIONS

This application is a U.S. National Phase application under 35 U.S.C. § 371 of International Application No. PCT/EP2018/083579, filed on Dec. 5, 2018, and claims benefit to European Patent Application No. EP 17206472.7, filed on Dec. 11, 2017; Chinese Patent Application No. CN 201711399442.8, filed on Dec. 22, 2017; Chinese Patent Application No. CN 201721813845.8, filed on Dec. 22, 2017; European Patent Application No. EP 17209929.3, filed on Dec. 22, 2017; and Korean Patent Application No. KR 10-2017-0178274, filed Dec. 22, 2017. The International Application was published in English on Jun. 20, 2019 as WO 2019/115306 under PCT Article 21(2).

FIELD

The present invention is related to the field of heat exchangers, in particular heat exchangers such as evaporators, superheaters, reheaters, and economizers intended to be used in thermal fluid steam generators such as Molten Salt Steam Generators (MSSG) of Concentrated Solar Power plants (CSP).

BACKGROUND

It is known that the CSP tower plants generally comprise one or more solar receivers which are situated at the apex of a central tower. These solar receivers are heated by concentrated incident solar rays and they generate a hot fluid that will be further used to produce high-pressure steam capable of driving a turbine and of producing electricity.

More specifically the CSP tower plant has as main components, namely, at least a heliostat solar field, a solar receiver installed on the top of the tower, a steam generator, a steam turbine and a storage system. In molten salt technology, the molten salt is heated typically to 565° C. in the solar receiver and stored in the hot storage tank. When a production of electricity is required, the hot salt flows from the hot tank to the Molten Salt Steam Generator (MSSG) to generate steam which will be injected into the steam turbine.

Figure 1:
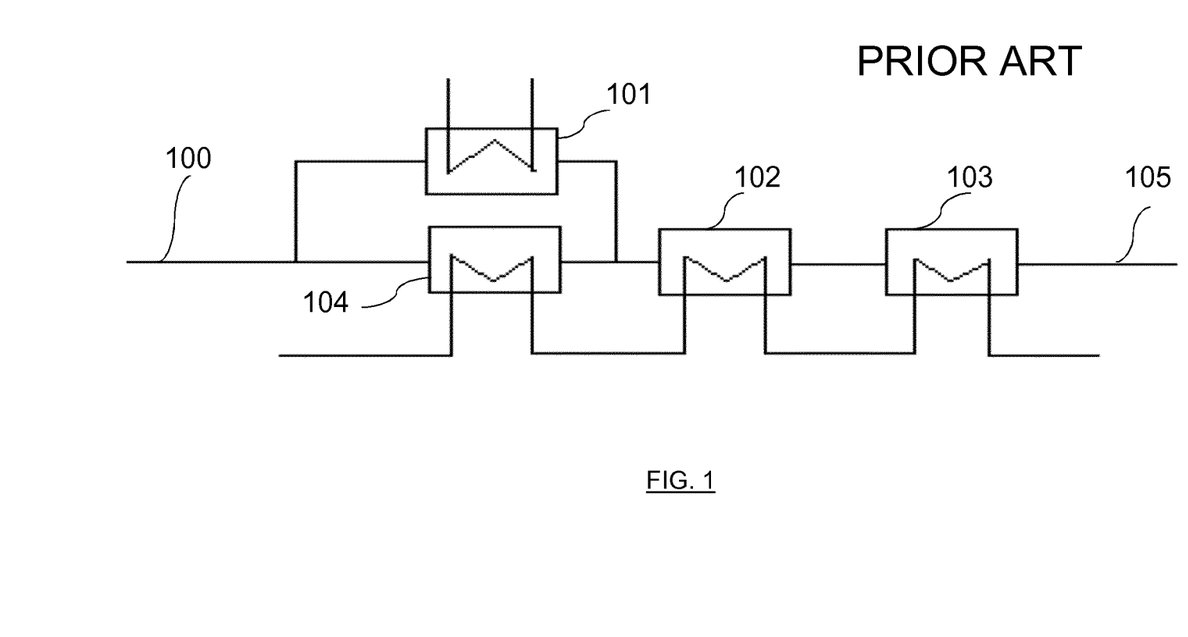
FIG. 1 diagrammatically represents the components of a typical heat exchanger train for a Molten Salt Steam Generator.

FIG. 1 diagrammatically shows the components of a typical so-called heat exchanger train for MSSG. The hot molten salt flows, from an inlet 100, through a reheater 101 (or a preheater with or without a reheater) and a superheater 104 to enter in an evaporator 102. Thereafter, the hot salt flows from the outlet of the evaporator 102 to the economizer 103 and further to the outlet 105.

So-called "shell and tube" heat exchangers refer in prior art to a class of heat exchanger designs suitable for higher pressure applications. This type of heat exchanger is consisting of a large pressure vessel called a "shell" having a set of tubes, called "bundle", inside it. A first fluid runs through the tubes while a second fluid flows inside the shell over the tubes, the first and the second fluid having different temperatures, with the aim of transferring heat from the second fluid to the first fluid or vice versa.

Figure 2:
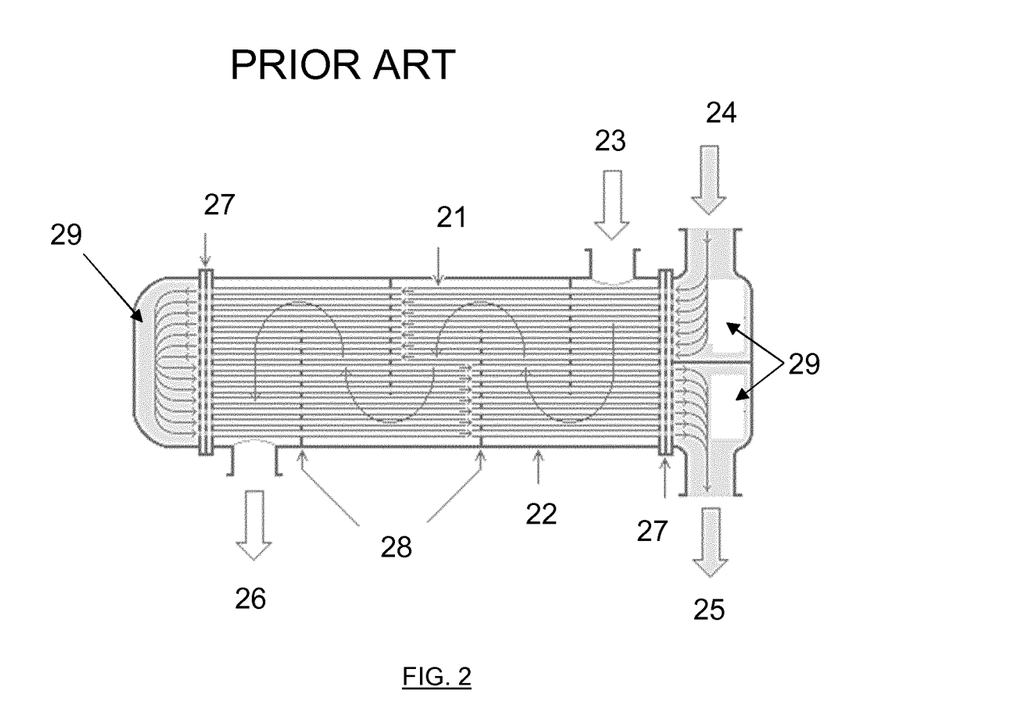
FIG. 2 schematically represents an embodiment for a "shell-and-tube" straight tube heat exchanger according to prior art.

There are many variations on the shell and tube design. As an example, FIG. 2 diagrammatically shows a straight-tube heat exchanger (two pass tube-side). The ends of each tube 21 are connected to water boxes or plenums 29 through holes provided in separating plates called 'tube sheets" 27. The tubes 21 may be straight, as depicted in FIG. 2, or bent in "U" (U-tubes).

To provide an improved heat exchange between the two fluids, the flow path of the second fluid is often determined by intermediate baffles 28 forming respective passages so that the second fluid flow changes its direction in passing from one passage to the next one. The baffles are usually under the form of partial circular segments or annular rings and disks, installed perpendicular to the longitudinal axis of the shell 22 to provide a zigzag flow of the second fluid.

Figure 3:
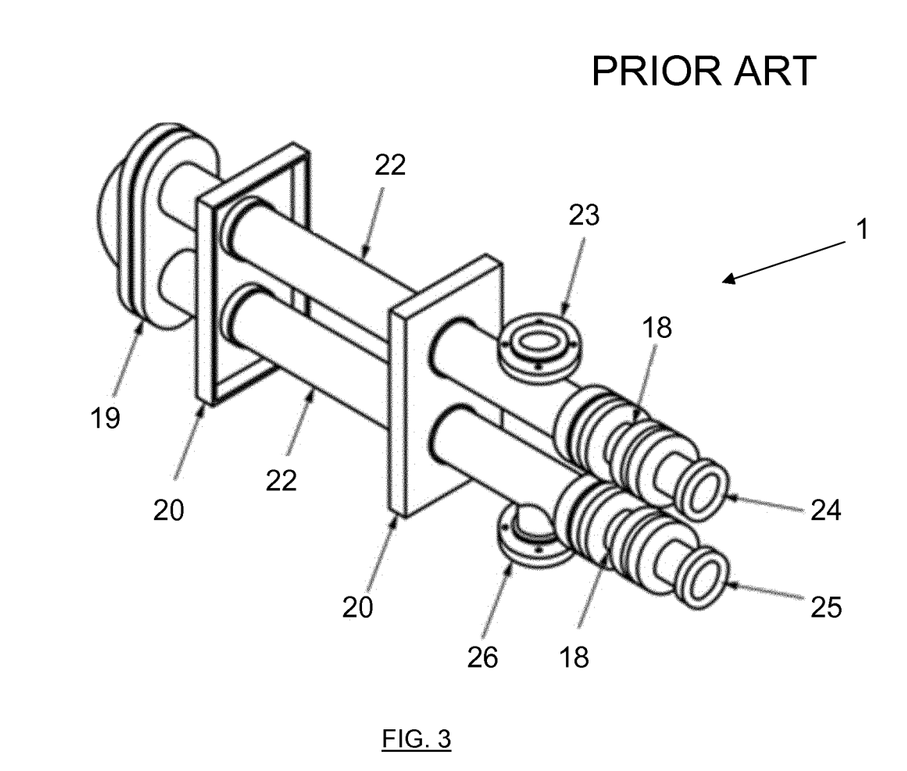
FIG. 3 represents a perspective view of a horizontal hairpin generator of prior art.

A prior art alternative of the above design, depicted in FIG. 3, is the horizontal hairpin heat exchanger. Hair pin heat exchanger 1 has two shells 22 containing the straight part of U-tubes. The head of the hairpin contains the 180° U-bent part of the tubes. The advantages of this hairpin design are:

no need for a joint expansion system, as thermal expansion is naturally managed by the hairpin design;

easier draining and venting of the exchanger owing to the straight tubes and to the horizontal position of the exchanger.

Different concepts of steam generator are already known. A synthesis of these different concepts is reported in the Sandia report 93-7084 "Investigation of thermal storage and steam generator issues, Bechtel Corporation", in which are listed advantages and drawbacks of the existing steam generators.

In order to improve efficiency of the heat transfer in the heat exchangers, it is known since the 1920s that baffles mounted in the shell can have a specific shape intended to guide the fluid in a helical path. Moreover, with a continuous helical baffle, the heat transfer rate increases of about 10% compared with that of conventional segmental baffles for the same shell-side pressure drop (J. Heat Transfer (2007), Vol. 129(10), 1425-1431). This pattern allows to reduce leakage streams occurring in segmental baffles and further to increase the heat transfer coefficient greatly (J. Heat Transfer (2010), Vol. 132(10), 101801). Also, the flow stratification and stagnant zone are avoided (according to calculations), which allows a complete draining and decreases fouling susceptibility (lower fouling resistance and lower heat transfer area).

Document WO 2009/148822 discloses baffles mounted in the shell to guide the fluid into a helical flow pattern, with different helix angles when the baffle is proximate the inlet and the outlet respectively. Documents U.S. Pat. Nos. 2,384,714, 2,693,942, 3,400,758, 4,493,368 and WO 2005/019758 each disclose each different kinds of baffles, but with the same aim of providing a helical flow pattern of the fluid. Document U.S. Pat. No. 1,782,409 discloses a continuous helical baffle.

Document GB 2 020 793 A discloses a counterflow heat exchanger, in particular a steam generator, having two fixed tube plates, an upper tube plate and a lower tube plate, arranged to face each other in parallel and coaxial relationship and having different mean diameters of the bored areas, a nest of tubes extending between said upper and lower tube plates, the tubes being connected to the tube plates and distributed substantially in a polar symmetry arrangement and having at one end an S-like bent portion, the rectilinear portion of the tube nest substantially comprising the thermal exchange zone being enclosed with substantially uniform distribution within an annular interspace defined between an inner jacket and an outer shroud attached to the tube plates. In use a heating fluid such as liquid sodium passes through the annular space to heat the fluid flowing in the tubes.

The current solutions are not satisfactory for example in terms of thermal gradient flexibility, efficiency (pressure drop, heat transfer coefficient), drainability, natural circulation, absence of corrosion and leakage, etc. and newly designed steam generator and/or individual heat exchangers thereof should meet technical requirements such as:

improved thermal efficiency by reducing internal leakages and bypass streams;
improved pressure drop by reducing local stream obstacles;
improved ramp-up capability;
improved reliability;
improved fouling behavior, etc.

Moreover fast start-up usually leads to leakage in particular at the connection between the tubes and the tube sheet.

SUMMARY

In an embodiment, the present invention provides a heat exchanger, comprising: a first straight section; a second straight section; and a bent section or elbow linking the first straight section and the second straight section, wherein each straight section comprises a part of an internal cylindrical shell and of an external cylindrical shell, both cooperating to form an intershell space enclosing a bundle of parallel U-bent tubes having each a first and a second straight part respectively located in the first straight section and second straight section of the exchanger and a 180°-bent part located in the bent section or elbow of the exchanger, so that, in use, a first fluid to be heated and vaporized is flowing in the tubes, wherein the external cylindrical shell is provided respectively at one end with an inlet and at another end with an outlet for a second fluid which is a hot thermal fluid, so that, in use, the second fluid is flowing according to an annular flow path within the intershell space and cooling down by exchanging heat with the first fluid flowing in the tubes, the intershell space enclosing also baffles to guide the second fluid, wherein the bundle of parallel U-bent tubes is connected via a connection to a first end, a first hemispherical bonnet distributing the first fluid to the tubes of the first straight section, and to a second end, a second hemispherical bonnet collecting the first fluid under a form of liquid, vapor, or a mixture of liquid/vapor from the tubes of the second straight section, each connection comprising a tube sheet configured to withstand a difference between the second fluid low pressure inside the intershell space and the first fluid high pressure inside the respective bonnet, wherein the tube sheet comprises a circular plate having a central circular orifice, and wherein the tube sheet further comprises a hemispherical shell located over the orifice and tightly connected to the circular plate, so as to make a physical separation between the first fluid and the second fluid.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

In an embodiment, the present invention aims to overcome the drawbacks of the heat exchangers of prior art intended for steam generators.

In particular, in an embodiment, the present invention aims to obtain a reduced-size heat exchanger presenting high flexibility in terms of thermal gradient as well as improved efficiency thanks to optimized hydrodynamic salt flow leading to lower pressure drop, lower internal leakage (by-pass), improved heat transfer coefficient, lower tendency to foul, easily drainable molten salt, natural circulation (i.e. without circulation pump), long lifetime, and competitive cost.

A first aspect of the present invention relates to a heat exchanger having a first straight section, a second straight section and a bent section or elbow linking the first straight section and the second straight section, each straight section comprising a part of an internal cylindrical shell and of an external cylindrical shell, both cooperating to form an intershell space enclosing a bundle of parallel U-bent tubes having each a first and a second straight part respectively located in said first straight section and second straight section of the exchanger and a 180°-bent part located in said bent section or elbow of the exchanger, so that, in use, a first fluid to be heated and vaporized is flowing in the tubes, said external cylindrical shell being provided respectively at one end with an inlet and at another end with an outlet for a second fluid which is a hot thermal fluid, so that, in use, said second fluid is flowing according to an annular flow path within the intershell space and cooling down by exchanging heat with the first fluid flowing in the tubes, said intershell space enclosing also baffles to guide the second fluid, wherein the bundle of parallel U-bent tubes is connected via a connection to a first end, where a first hemispherical bonnet distributes the first fluid to the tubes of the first straight section, and to a second end, where a second hemispherical bonnet collects the first fluid under the form of liquid, vapor or a mixture liquid/vapor from the tubes of the second straight section, each said connection being made of a tube sheet which is designed to withstand the difference between the second fluid low pressure inside said intershell space and the first fluid high pressure inside the respective bonnet, wherein the tube sheet comprises a circular plate having a central circular orifice and wherein the tube sheet further comprises a hemispherical shell located over said orifice and tightly connected to said circular plate, so as to make a physical separation between the first fluid and the second fluid.

According to preferred embodiments of the invention, the hairpin heat exchanger also comprises one of the following characteristics or a suitable combination thereof:

the thickness of the circular plate is larger than the thickness recommended by the ASME standard for withstanding the same pressure difference;

the interface between the bonnet and the tube sheet circular plate is essentially planar and the hemispherical shell is oriented towards the interior of the heat exchanger and located inside the internal cylindrical shell;

the thickness of the hemispherical shell is comprised between 20% and 40% of the thickness of the tube sheet plate;

said first straight section and said second straight section consist in separated enclosures linked by said elbow, so that to form a hairpin heat exchanger shell;

said first straight section, said second straight section and said bent section or elbow consist in one single enclosure or shell enclosing the bundle of parallel U-tubes and wherein the first hemispherical bonnet and the second hemispherical bonnet coincide;

the heat exchanger is horizontal and the flow of the second fluid with respect to the flow of the first fluid therein is either co-current or counter-current;

said first fluid is a fluid comprising feedwater or supercritical carbon dioxide;

said second fluid is a molten salt or a mixture of molten salts, a thermal oil or liquid sodium;

the baffles are under the form of a continuous helical baffle;

the baffles are assembled, preferably welded or bolted, to the internal cylindrical shell;

a sealing means is provided between the external shell and the baffles;

the heat exchanger is equipped with a distribution jacket for uniformly feeding the second fluid from the thermal fluid inlet to the heat exchanger;

the distribution jacket has a plurality of openings distributed at 360° over an internal face thereof, said openings preferably feeding the second fluid into a first turn of the helical baffle.

A second aspect of the invention relates to an evaporator made of a heat exchanger as described above.

A third aspect of the invention relates to a superheater made of a heat exchanger as described above.

A fourth aspect of the invention relates to a reheater and/or an economizer and/or a preheater made of a heat exchanger as described above.

A fifth aspect of the invention relates to a molten salt steam generator (MSSG) comprising at least one heat exchanger train made of an evaporator, a superheater, a reheater and/or economizer and/or preheater as described above. Advantageously, the superheater, the reheater and/or the economizer and/or the preheater are running counter-current, while the evaporator is running co-current.

Still under the scope of the present invention, the molten salt steam generator is a once-through or a forced circulation steam generator.

A first preferred embodiment of the present invention relates to a new design for a horizontal hairpin heat exchanger 1, as depicted in FIGS. 4 to 9.

The heat exchanger has a reciprocating flow between two fluids. A first fluid, generally a mixture of water and water steam, circulates through a first bundle of parallel horizontal straight tubes sections 2 located in the first straight part of the hairpin and further through a second bundle of parallel horizontal straight tubes sections 2 located in the second straight part of the hairpin. The tubes 2 of the first bundle are connected to the tubes 2 of the second bundle by 180° bent tube sections located in the head of the hairpin or elbow 32, forming thereby U-bent tube sections.

Supercritical carbon dioxide is an example of usable alternate first fluid in the present invention.

Figure 5:
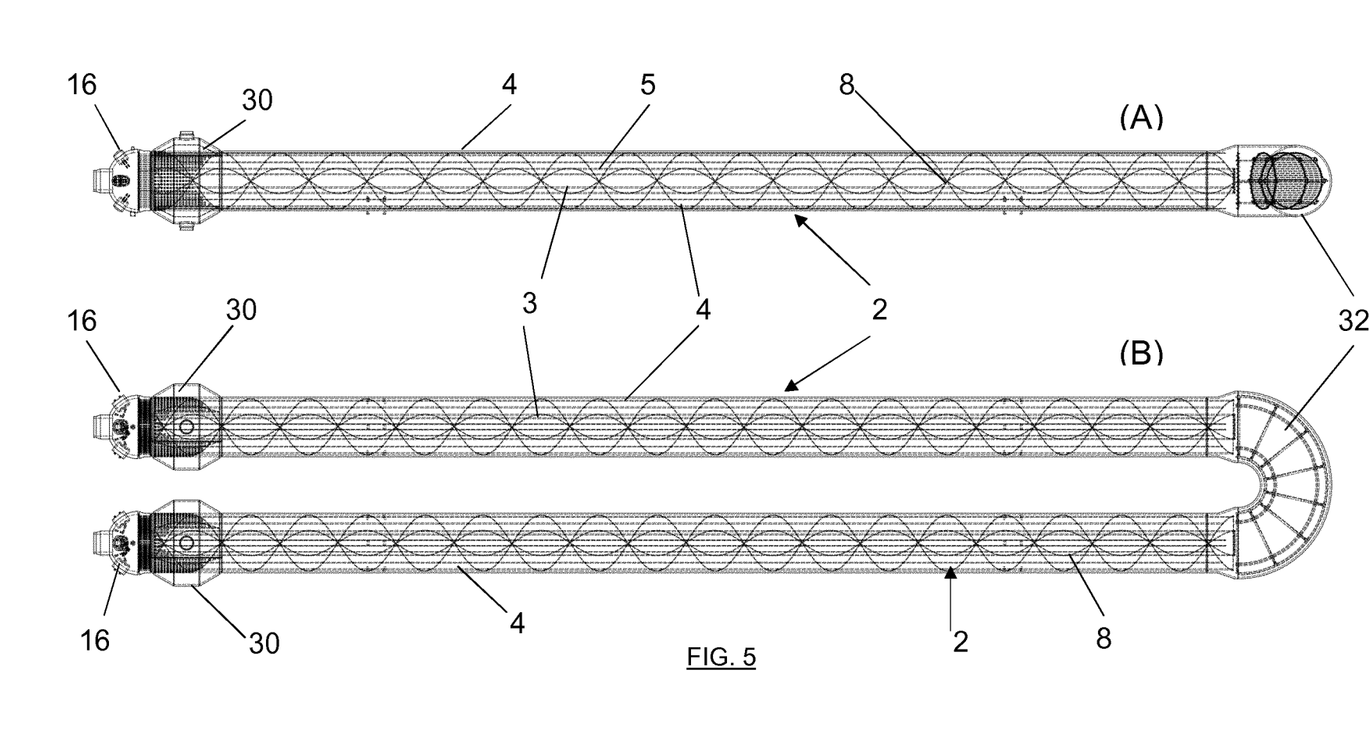
FIGS. 5A and 5B respectively show corresponding cross-sectional views of the heat exchanger according to the embodiment of FIG. 4.
Figure 6:
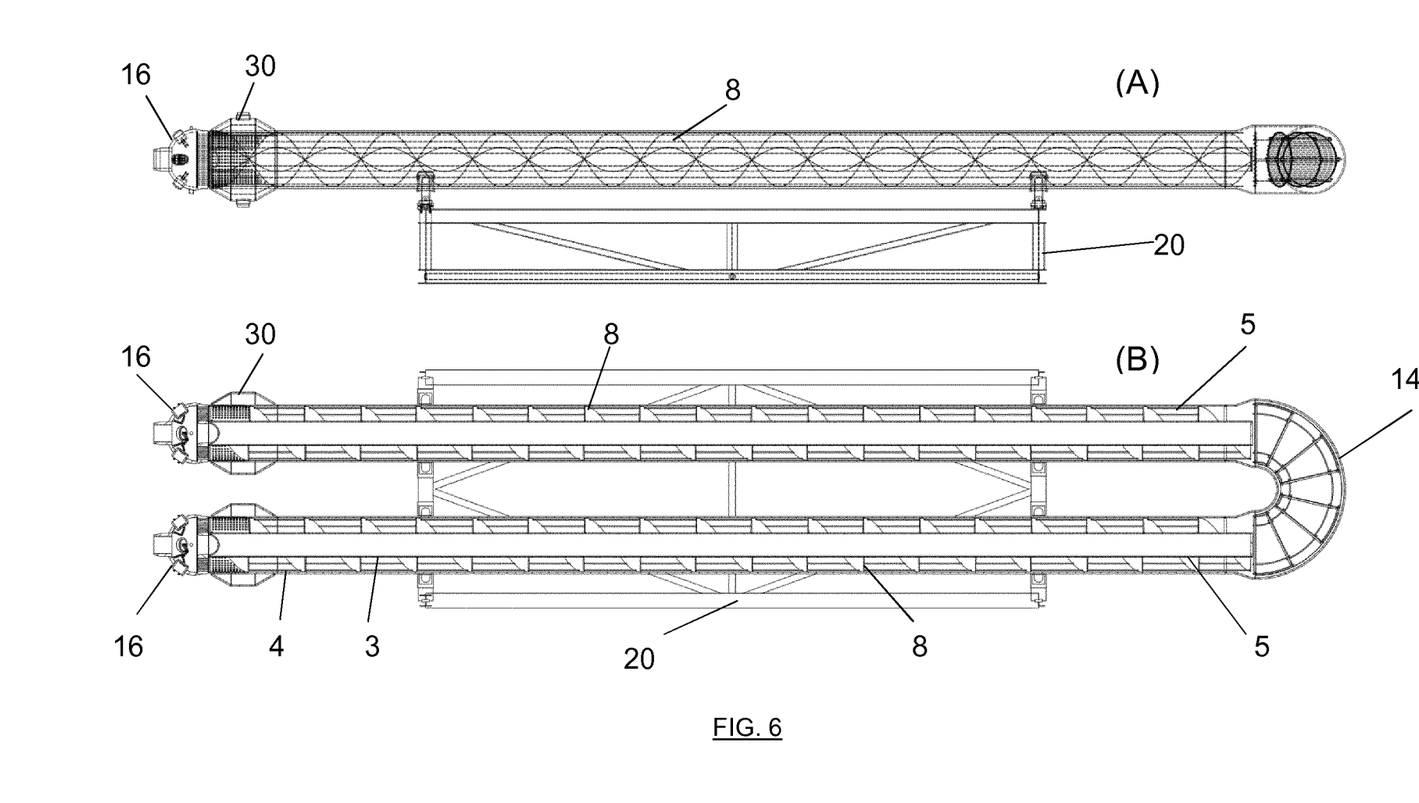
FIGS. 6A and 6B respectively show views corresponding to FIG. 5 but with a supporting system of the heat exchanger.

According to this embodiment, the bundle of tubes 2 in each straight part is located between an internal cylindrical shell 3 and an external cylindrical shell 4, as represented in FIG. 5 and FIG. 6.

The internal space 5 delimited by the two shells 3, 4 permits to hold a heat source, preferably a second fluid, within an annular flow path. This second fluid is a thermal fluid, for example molten salt(s) having been heated by the solar receivers at the apex of a CSP tower plant. The thermal fluid, by having its flow in contact with the bundle(s) of tubes 2, will transfer heat to the parallel-flowing first fluid running through the tubes 2. The first fluid and the second fluid can be co-current or counter-current, without departing from the scope of the present invention. Similarly the heat source or the second fluid can be any thermal fluid such as water, thermal oil, liquid sodium, fluidized bed, etc.

Figure 4:
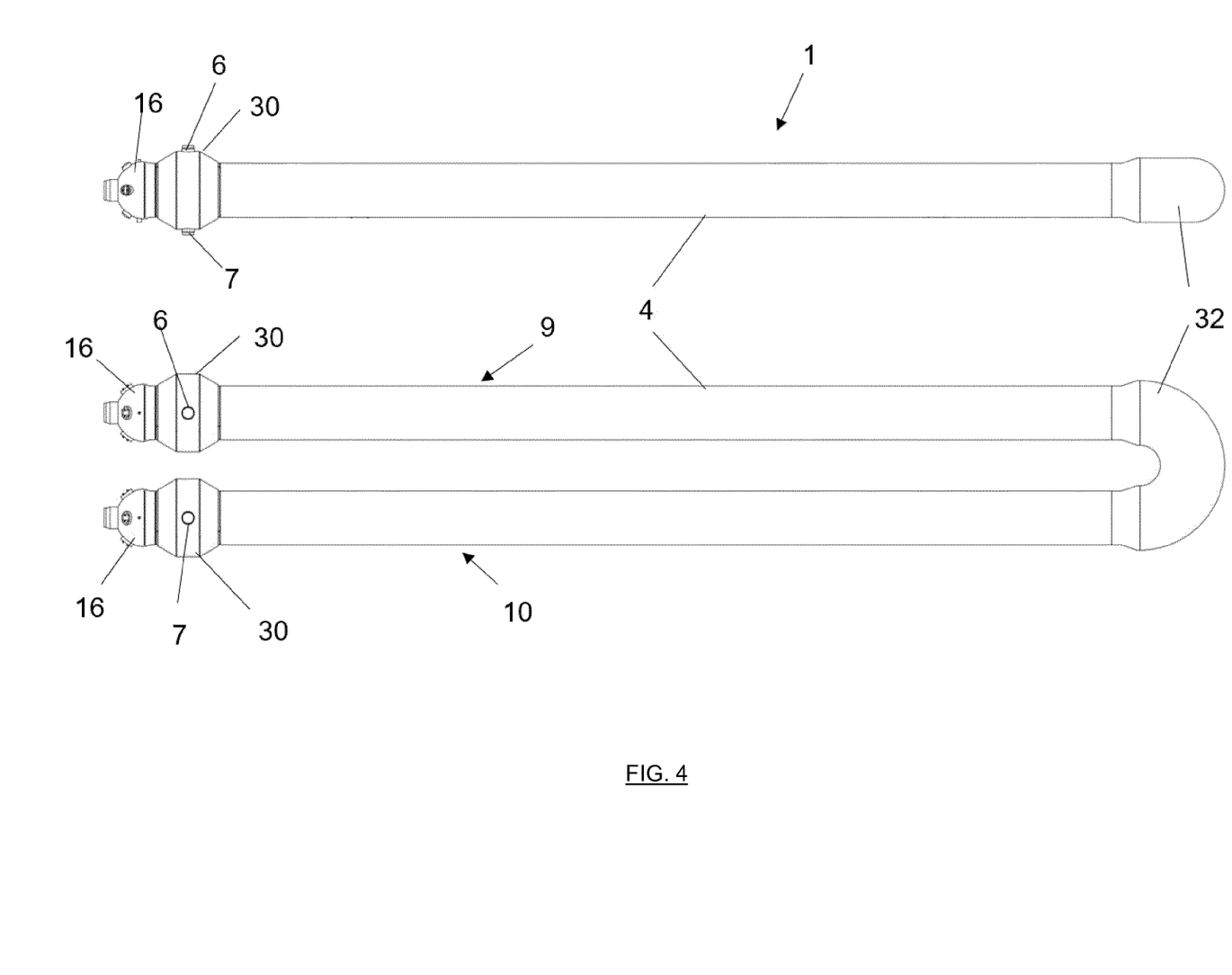
FIGS. 4A and 4B respectively show a plane view and an elevation view for a first preferred embodiment of a heat exchanger according to the present invention.

As illustrated by FIG. 4, a first distribution jacket 30 is provided at one end of the heat exchanger 1 with an inlet nozzle 6, respectively an outlet nozzle 6, through which the thermal fluid enters into, respectively leaves the heat exchanger 1. Similarly, an outlet nozzle 7, respectively inlet nozzle 7, is provided on a second distribution jacket 30 at another end of the heat exchanger 1 in order to discharge the cooled thermal fluid, respectively admit the hot fluid.

Advantageously, the thermal fluid is uniformly distributed on the shell at 360° (inlet, circulation, fluid temperature) thanks to said distribution jacket 30 located at the inlet nozzle of the heat exchanger.

In order to improve the efficiency of heat transfer, as shown in FIG. 5 and FIG. 6, space 5 is provided in the straight parts of the hairpin exchanger with an enclosed continuous helical baffle 8 allowing to guide the flow of the thermal fluid. The thermal fluid then helically flows in the heat exchanger, which is for example an evaporator running under natural circulation, between the internal and the external shell, according to an annular flow path. The continuous helical baffle configuration ensures a gentle flowing of the second fluid, thereby avoiding any sharp direction change or dead zones as in the exchangers having flow-perpendicular baffles. In this manner, the heat transfer rate is greatly increased and the pressure drop is greatly lowered compared with that of exchangers with conventional segment baffles (see above).

According to one embodiment, the internal cylindrical shell 3 and the baffles 8 can be welded or bolted together. Further a sealing means can be provided between the external shell 4 and the baffles 8 to avoid parasitic streams.

Advantageously the helical baffles are designed using an innovative solution (sealing device and manufacturing) in order to have the smallest gap possible between baffles and tubes. This allows to suppress or at least strongly reduce the bypass between baffles and through tubes.

Figure 7:
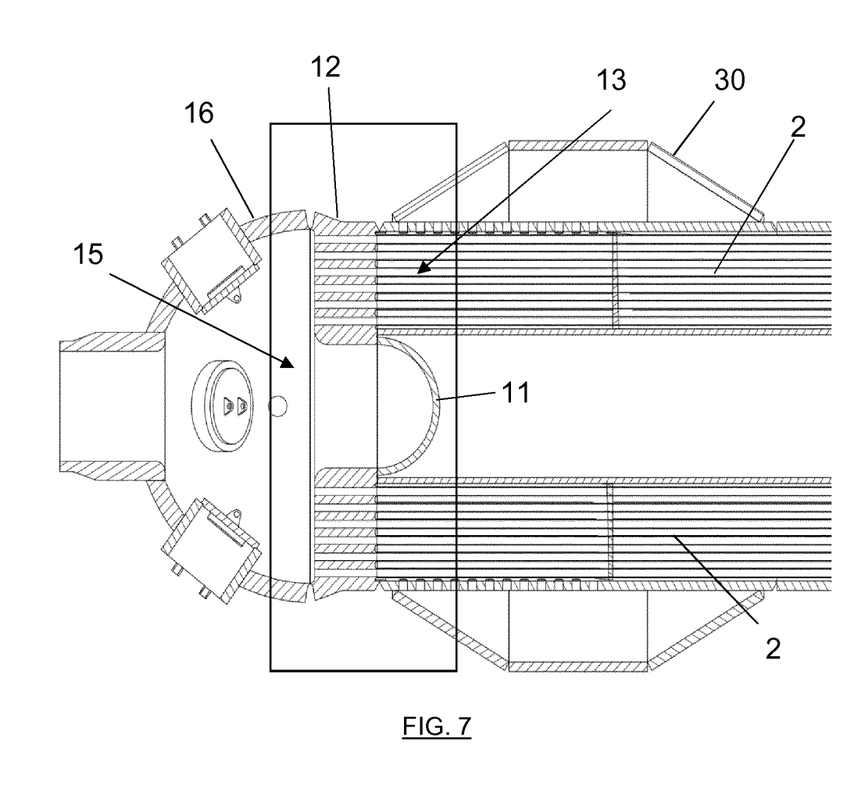
FIG. 7 is a longitudinal cross-sectional detailed view of one exchanger end according to the invention, focusing on the particular tube sheet.
Figure 8:
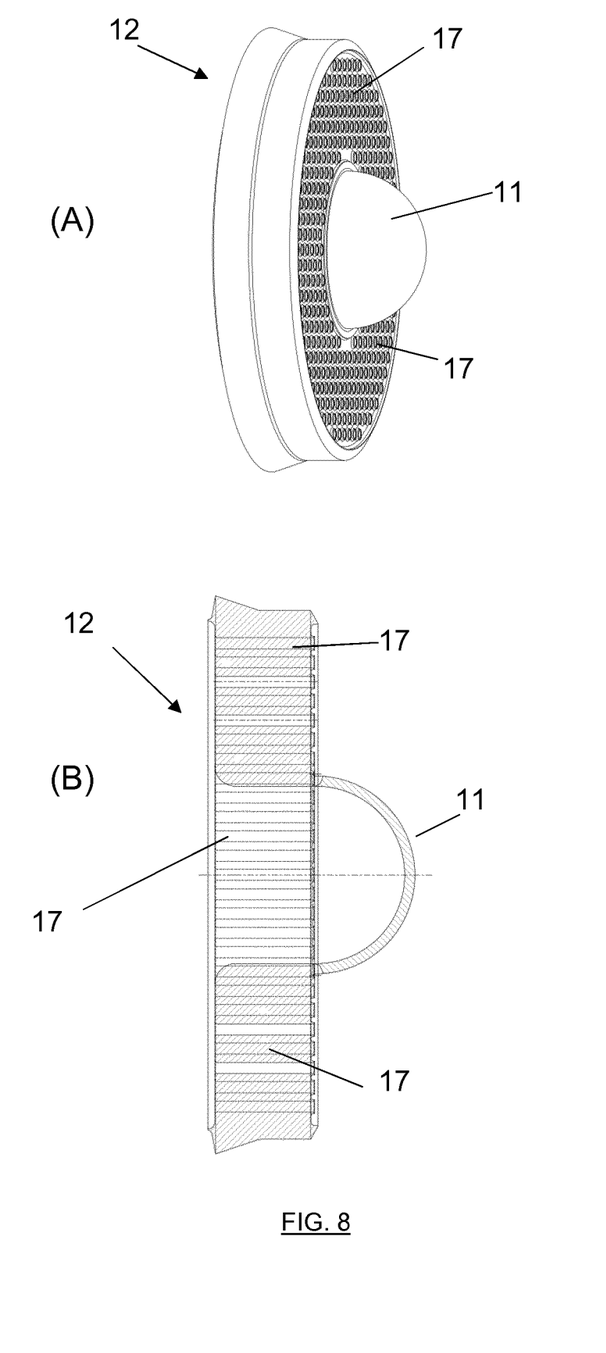
FIGS. 8A and 8B respectively show a perspective view and a cross-sectional view of the above-mentioned particular tube sheet.

Still according to the invention, as shown on FIG. 7, on each external end of the hairpin exchanger straight part, the annular bundle of parallel straight tubes 2 is connected, through a particular tube sheet 11, 12, to a (hemi) spherical bonnet 16 containing the high pressure fluid (steam/water steam). The specific tube sheet 11, 12 has the following characteristics:

the tube sheet plate 12 itself is empty in its center, an orifice being machined therein and corresponding to the prolongation of the heat exchanger straight part lacking tubes 2;

the physical tight separation between the molten salt low pressure zone 13 in the heat exchanger straight part and the high pressure water/steam bonnet zone 15 (see rectangular frame) is ensured by a spherical surface head 11 welded or tightly connected to the tube sheet plate 12 above said orifice;

the tube sheet plate 12 is thicker then usually designed in prior art, that is according to the recommendation of ASME (for American Society of Mechanical Engineers) code.

According to the above characteristics, the heat exchanger components cooperate so that the heat exchanger operates as follows:

the spherical bonnet 16 distributes the first fluid (such as water/steam) towards the tube sheet 12; the spherical shape of the bonnet allows to design a bonnet which is thinner;

the tube sheet 12 distributes the first fluid towards, resp. from, the tube bundles 2 at the inlet, respectively the outlet of the heat exchanger;

the annular salt flow down (of second fluid) is improved by the continuous helical baffles 8 of the shell-and-tube configuration and the U-tubes design 14 allows to manage the differential thermal expansion of the tubes.

As in the classical shell-and-tube configuration, the first fluid, usually water, is under high pressure in quasi-spherical vessels or plenums. On the other side of the tube sheet, the salt flowing around the tube bundles is maintained under much lower pressure, requiring very thick tube sheets to withstand the pressure difference.

It is an unexpected effect or advantage of the invention to propose a tube sheet that is even thicker than the one prescribed in prior art. Oversizing the tube sheet plate 12 helps reducing the bending stress thereof and reduces creep. Moreover, specific machining of the tube sheet and/or the bonnet allows reducing the amount of useless metal.

Example

The present invention is flexible and intended to be applied to a series of heat exchanger design used in MSSG technology, such as reheater, superheater, economizer, preheater and evaporator devices, wherein all the common components are made according to the generic heat exchanger design of the invention.

As mentioned above (FIG. 1), a hot molten salt with decreasing temperature flows for example firstly in parallel through a reheater and a superheater to recombine and enter into the evaporator and further in the preheater/economizer in series.

In current embodiments, hot molten salt entering the system at high temperature, for example 563° C. (and certainly below 650° C. which is the degradation temperature for the usual molten salts) flows in parallel through the superheater and reheater, combines and passes in series through the evaporator and preheater. Cold salt leaves the preheater at a temperature typically in the range of 290-300° C., preferably at about 293° C., or above a minimum temperature which is either the solidification temperature of the heat transfer fluid (as low as 90° C. for the molten salts such as sodium derivatives). Alternately any thermal fluid, e.g. thermal oil, can be used instead of molten salt with an operating temperature range in this case going for example from 80° C. (condensation and/or cristallization temperature) to 380° C. (example of degradation temperature).

Moreover it is under the scope of the present invention that the thermal fluid can have a temperature up to 700° C. All metal parts are advantageously made of stainless steel or noble metals which can withstand temperatures up to 600° C. and above.

More specifically, according to one embodiment, molten salt coming from the reheater and superheater enter the evaporator through the inlet nozzle, then helically flows in the evaporator in a natural circulation way in the annular space located between an internal pipe and an external shroud, as described above. Saturated water flows from the steam drum (spherical or horizontal) of the evaporator through the downcomers and from the hemispherical bonnet to U-tubes inside the heat exchanger for steam generation. In this design, water at high pressure flows in tubes which are not in contact with the shells. Preferably all the heat exchangers are horizontal.

Although the design of the exchanger according to the present invention is optimized for natural circulation running, it could also be used in once-through or forced circulation steam generators.

Figure 9:
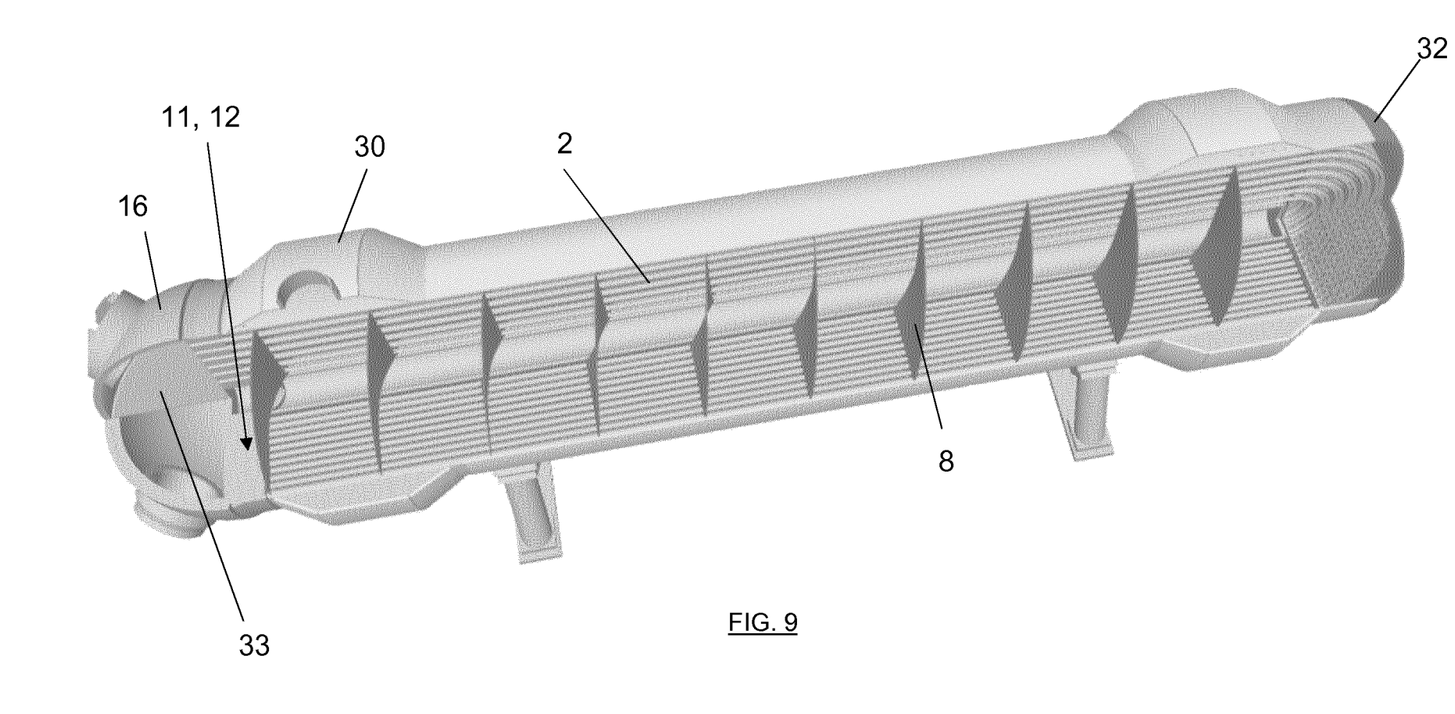
FIG. 9 is a cutaway 3D view for a second embodiment of the present invention showing an evaporator with a U-tube design.

According to one alternate embodiment of the invention shown on FIG. 9, the straight tubes sections of the first tube bundle and of the second tube bundle make one single U-tube bundle located in a single enclosure or shell (not making a hairpin shell), the elbow 32 of the U-tubes 2 being on one side of the exchanger and the entry/exit of the single U-tube bundle located on the other side being connected to a spherical bonnet 16 through a tube sheet 11, 12 according to the invention.

Figure 10:
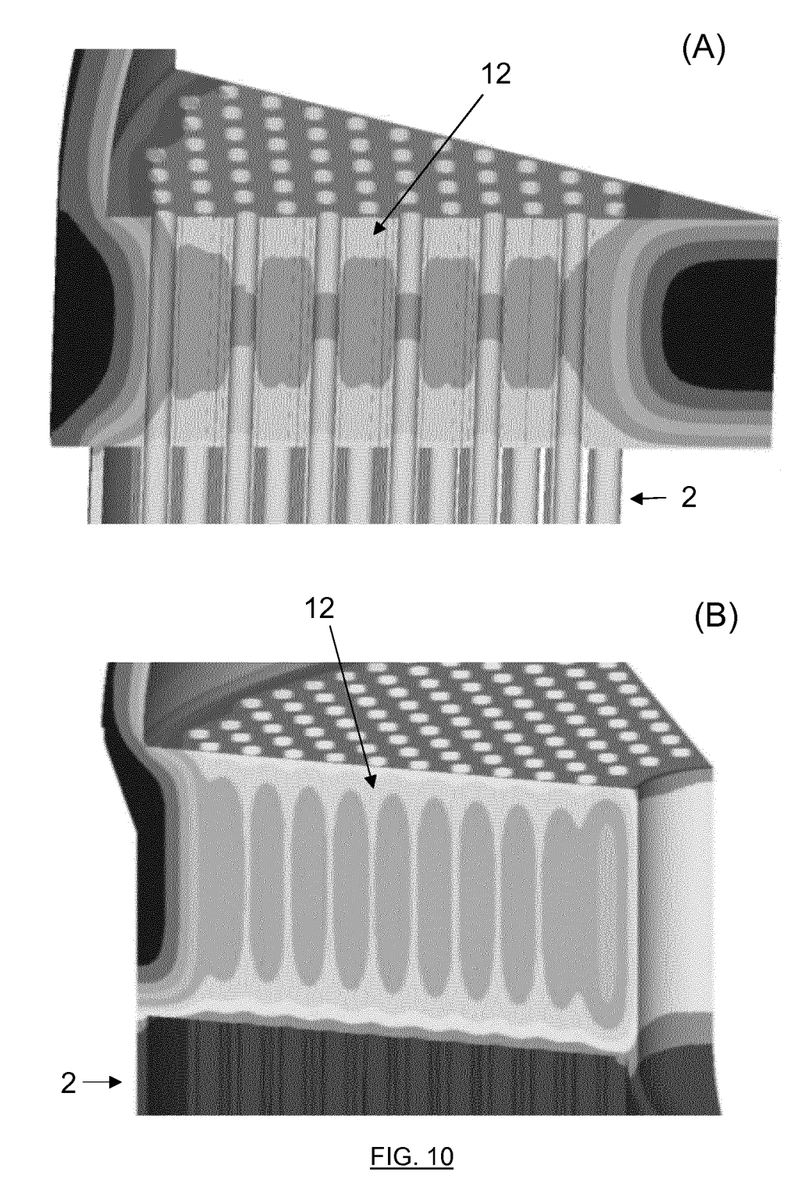
FIGS. 10A and 10B show respective thermography simulation data for a tube sheet according to prior art (A) and to the particular tube sheet of the present invention (B).

The present invention advantageously provides particularly high flexibility in terms of thermal gradient thanks to the following features:

the tube sheet is empty in its center to avoid any harmful thermal gradient inside the tube sheet; it improves the thermal behavior of this component during the start-up so that the lifetime of this component is longer (see FIG. 10B where the thermal gradient in the tube sheet is lower for the present invention as compared with prior art in FIG. 10A);

a specific machining may be foreseen between the tube sheet 12 and the inner pipe 3 so as to avoid peak stress and so as to improve the lifetime of this latter component;

a specific machining may also be foreseen between the tube sheet 12 and the spherical bonnet 16 (absence of flanges);

a spherical bonnet 16 has been selected as a header or end part to avoid any cold area during the startup of the installation;

water at high pressure flows in the tubes or pipes 2 not in the shell side 4 which allows lower thickness thereof and consequently a higher thermal gradient capability;

traditional straight baffles are replaced by helical baffles 8 which involve that salt is flowing helically while water is restricted to flow in tubes 2;

continuous helical baffles 8 allow smooth flow direction change. At equivalent ΔP, continuous helical baffles 8 ensure higher speed flow, higher exchange surface and smaller heat exchanger design in comparison to conventional baffles. Moreover, the risk of fouling is lower as there is no dead zone with such baffle design.

Moreover, according to the present invention, particular connection of the tubes to the tube sheet, such as IBW (internal bore wilding) known as such in the art, may provide a corrosion free and leakage free solution (no risk of crevice corrosion, no risk of leak, or of relaxation).

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SYMBOLS

1 Hairpin heat exchanger
2 Straight tube (section)
3 Internal cylindrical shell
4 External cylindrical shell
5 Intershell space
6 Thermal fluid inlet
7 Thermal fluid outlet
8 Helical baffle
9 First straight section
10 Second straight section
11 Spherical head of tube sheet
12 Thick tube sheet
13 Second low pressure fluid (molten salt)
14 U-bent tube
15 High pressure fluid (water/steam)
16 Bonnet (inlet or outlet)
17 Tube passageway
18 Front closure
19 Rear closure
20 Support
21 Straight tube
22 Shell
23 Shell-side fluid in
24 Tube-side fluid in
25 Tube-side fluid out
26 Shell-side fluid out
27 Tube sheet
28 Straight baffle
29 Water box or plenum or bonnet
30 Distribution jacket
32 Elbow
33 Separation plate
100 Molten salt inlet of the MSSG
101 Reheater of the MSSG
102 Evaporator of the MSSG
103 Economizer of the MSSG
104 Superheater of the MSSG
105 Molten salt outlet of the MSSG

The invention claimed is:

1. A heat exchanger, comprising:
a first straight section;
a second straight section; and
a bent section or elbow linking the first straight section and the second straight section,
wherein each straight section comprises a part of an internal cylindrical shell and of an external cylindrical shell, both cooperating to form an intershell space enclosing a bundle of parallel U-bent tubes having each a first and a second straight part respectively located in the first straight section and second straight section of the exchanger and a 180°-bent part located in the bent section or elbow of the exchanger, so that a first fluid to be heated and vaporized flows in the tubes,
wherein the external cylindrical shell is provided respectively at one end with an inlet and at another end with an outlet for a second fluid which is a hot thermal fluid, so that the second fluid flows according to an annular flow path within the intershell space and cooling down by exchanging heat with the first fluid flowing in the tubes, the intershell space enclosing baffles configured to guide the second fluid,
wherein the bundle of parallel U-bent tubes is connected via a connection to a first end, a first hemispherical bonnet distributing the first fluid to the tubes of the first straight section, and a connection to a second end, a second hemispherical bonnet collecting the first fluid under a form of liquid, vapor, or a mixture of liquid/vapor from the tubes of the second straight section, each connection comprising a tube sheet comprising a hemispherical shell such that the tube sheet is configured to withstand a difference between the second fluid low pressure inside the intershell space and the first fluid high pressure inside the respective bonnet,
wherein each tube sheet comprises a circular plate having a central circular orifice, and
wherein each hemispherical shell is located over a respective orifice and tightly connected to the circular plate so as to make a physical separation between the first fluid and the second fluid, each hemispherical shell being oriented towards an interior of the heat exchanger and located inside the internal cylindrical shell.

2. The heat exchanger according to claim 1, wherein the interface between each bonnet and the respective tube sheet circular plate is essentially planar.

3. The heat exchanger according to claim 1, wherein a thickness of the hemispherical shell is between 20% and 40% of a thickness of the tube sheet plate.

4. The heat exchanger according to claim 1, wherein the external cylindrical shell of the first straight section and the external cylindrical shell of the second straight section are linked by the elbow so as to form a hairpin heat exchanger shell.

5. The heat exchanger according to claim 1, wherein the first straight section, the second straight section, and the bent section or elbow comprise one single enclosure or shell enclosing the bundle of parallel U-tubes, and wherein the first hemispherical bonnet and the second hemispherical bonnet coincide.

6. The heat exchanger according to claim 1, wherein the heat exchanger is horizontal and the flow of the second fluid therein with respect to the flow of the first fluid is either co-current or counter-current.

7. The heat exchanger according to claim 1, wherein the first fluid comprises feedwater or supercritical carbon dioxide.

8. The heat exchanger according to claim 1, wherein the second fluid comprises a molten salt or a mixture of molten salts, a thermal oil, or liquid sodium.

9. The heat exchanger according to claim 1, wherein each baffle of the baffles comprises a continuous helical baffle.

10. The heat exchanger according to claim 1, wherein the baffles are attached to the internal cylindrical shell.

11. The heat exchanger according to claim 1, wherein the heat exchanger is equipped with a distribution jacket configured to uniformly feed the second fluid from the thermal fluid inlet to the heat exchanger.

12. The heat exchanger according to claim 11, wherein the distribution jacket has a plurality of openings distributed at 360° over an internal face thereof, the openings feeding the second fluid into a first turn of the helical baffle.

13. An evaporator, comprising:
the heat exchanger according to claim 1.

14. A superheater, comprising:
the heat exchanger according to claim 1.

15. A reheater or an economizer and/or a preheater, comprising:
the heat exchanger according to claim 1.

16. A molten salt steam generator (MSSG), comprising:
at least one heat exchanger train comprising an evaporator comprising the heat exchanger according to claim 1;
a superheater comprising the heat exchanger according to claim 1; and
a reheater and/or economizer and/or preheater comprising the heat exchanger according to claim 1.

17. The molten salt steam generator according to claim 16,
wherein the superheater, the reheater and/or the economizer, and/or the preheater are configured to run counter-current, while the evaporator is configured to run co-current.

* * * * *